US009131020B2

(12) United States Patent
Bastide et al.

(10) Patent No.: US 9,131,020 B2
(45) Date of Patent: Sep. 8, 2015

(54) FOCUSED REAL TIME COLLABORATION

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 13/710,506

(22) Filed: Dec. 11, 2012

(65) Prior Publication Data

US 2014/0164531 A1 Jun. 12, 2014

(51) Int. Cl.
*G06F 15/16* (2006.01)
*H04L 29/06* (2006.01)
*H04L 12/58* (2006.01)

(52) U.S. Cl.
CPC ............ *H04L 65/403* (2013.01); *H04L 51/043* (2013.01); *H04L 51/14* (2013.01)

(58) Field of Classification Search
CPC ... H04L 12/585; H04L 12/5855; H04L 51/12; H04L 51/14; H04L 51/26; H04L 51/043; H04L 65/403
See application file for complete search history.

(56) References Cited

U.S. PATENT DOCUMENTS

| | | | |
|---|---|---|---|
| 7,912,903 B2 | 3/2011 | Shah | |
| 2004/0236839 A1* | 11/2004 | Wilson et al. | 709/207 |
| 2006/0242246 A1* | 10/2006 | Lyle et al. | 709/206 |
| 2007/0143428 A1 | 6/2007 | Kumar et al. | |
| 2007/0143472 A1 | 6/2007 | Clark et al. | |
| 2009/0113451 A1* | 4/2009 | Grigsby et al. | 719/318 |
| 2009/0113452 A1* | 4/2009 | Grigsby et al. | 719/318 |
| 2009/0177749 A1* | 7/2009 | McLean et al. | 709/206 |
| 2013/0339453 A1* | 12/2013 | Aggarwal et al. | 709/206 |

* cited by examiner

*Primary Examiner* — Jonathan Bui
(74) *Attorney, Agent, or Firm* — Jason H. Sosa

(57) ABSTRACT

Aspects of the present invention disclose a system, method and computer program product for focused real time collaboration. In an example, a computer receives an electronic message from a first user, the electronic message being addressed to an intended recipient. The computer determines that a posted status of the intended recipient indicates that the intended recipient is not available to actively receive electronic messages from users. The computer analyzes whether the first user is on a list of users in a collaborative event with the intended recipient. The computer stores the electronic message in local storage. The computer determines that a natural breakpoint is reached in the collaborative event by the intended recipient indicating that the intended recipient is available to actively receive electronic messages from users regardless of the status of the intended recipient. The computer transmits the electronic message to a computer of the intended recipient.

18 Claims, 3 Drawing Sheets

FOCUSED REAL TIME COLLABORATION

FIELD OF THE INVENTION

The present invention relates generally to electronic messaging, and more particularly to detecting active collaboration for relaying information.

BACKGROUND

Technology in the field of communicating electronically has existed and been expanded upon for some time. There have been strides made to make communicating electronically more convenient and personal, allowing users participating in an electronic communication to set preferences for use. Users have had the ability to declare their status if they are available to communicate and/or receive information. Typically, the declared status provides only an indication to other users and does not prevent other users from sending messages or information. In some instances, however, messages and information can be prevented from being sent based on a declared status, or can even be routed through email. For example, if a user wants to avoid any interruptions, the user can set their status of availability to "do not disturb" where any messages being sent to the user are sent in an email form.

SUMMARY

Aspects of the present invention disclose a method, computer system, and computer program product for focused real time collaboration.

Embodiments include a system, method and program for focused real time collaboration. In an example, a computer receives an electronic message from a first user, the electronic message being addressed to an intended recipient. The computer determines that a posted status of the intended recipient indicates that the intended recipient is not available to actively receive electronic messages from users. The computer analyzes whether the first user is on a list of one or more users in a collaborative event with the intended recipient. In response to a determination that the first user is not on the list of the one or more users, the computer stores the electronic message in local storage. The computer determines that a natural breakpoint is reached in the collaborative event by the intended recipient indicating that the intended recipient is available to actively receive electronic messages from users regardless of the status of the intended recipient. In response to determining that the natural breakpoint has been reached, the computer transmits the electronic message to a computer of the intended recipient.

DETAILED DESCRIPTION

Figure 1:
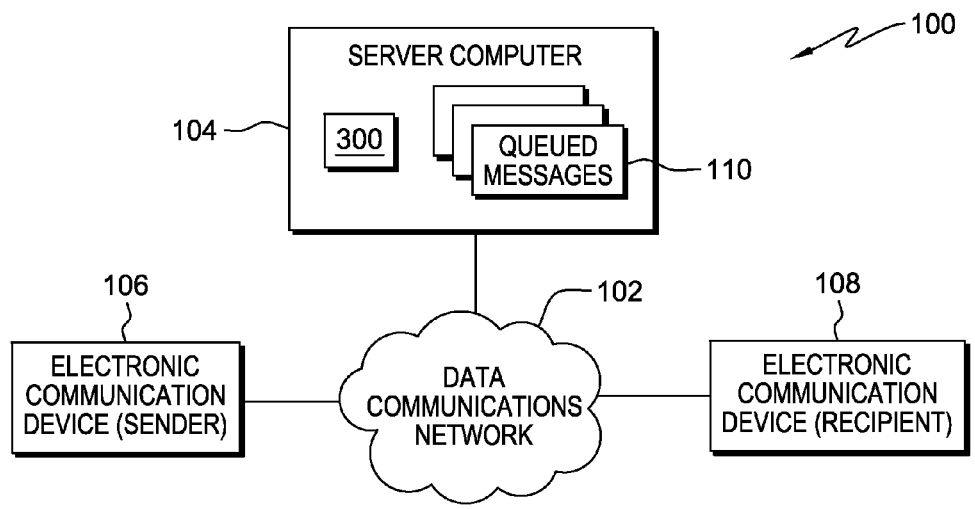
FIG. 1 is a block diagram of a distributed data processing environment in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention will now be described in detail with reference to the accompanying drawings.

Embodiments of the present invention recognize that a user of a messaging program may neglect to change their status from "unavailable" even after their participation in a meeting has ended or they have otherwise become available to receive messages. It is also recognized that if a potential recipient of an electronic message has a set status of "available," the potential recipient is not always readily available for response. For example, the potential recipient may be editing a document, participating in a phone call, or otherwise occupied.

An embodiment of the present invention provides a method, computer program product, and system for managing the delivery of electronic messages based on an active collaboration list of a potential recipient. In accordance with one embodiment of the present invention, an electronic message can be queued for subsequent delivery when the sender is not on the active collaboration list of the potential recipient. In response to the sender being on the collaboration list of the recipient the electronic message is forwarded to the recipient. If the sender is not on the collaboration list of the recipient, the electronic message is queued until a natural breakpoint is reached.

FIG. 1 is a functional block diagram of distributed data processing environment 100, which is an environment in which users may communicate by sending electronic messages back and forth. Distributed data processing environment 100 contains server computer 104, electronic communication device 106 of a sender, and electronic communication device 108 of a recipient all connected over data communications network 102. Server computer 104 may manage the flow of electronic messages between electronic communications device 106 and electronic communications device 108 by executing message delivery program 300 and storing queued messages 110. Message delivery program 300 may also determine when and how to store, send, and route electronic messages according to various embodiments of the present invention.

Distributed data processing environment 100 represents an exemplary environment for delivery of an electronic message based on a collaboration list. Electronic messages sent within distributed data processing environment 100 may include, in a non-exhaustive list: an email, an instant message, and a live video stream. Electronic communication device 106 transmits an electronic message to electronic communication device 108 through data communication network 102. Server computer 104 facilitates the transfer of electronic messages over data communication network 102. The electronic message can be transferred between data communication network 102 and one or more additional data communication networks.

Electronic communication devices 106 and 108 may be, but are not limited to: a computer, a laptop computer, a tablet computer, a mobile phone and a smart phone. As depicted, electronic communication device 106 is a device sending an electronic message, and electronic communication device 108 is the intended recipient device of the electronic message. In the depicted environment, server computer 104 executes message delivery program 300. In another embodiment, message delivery program 300 may execute on electronic communication device 106 or 108.

When electronic communication device 106 sends an electronic message to recipient electronic communication device 108, message delivery program 300 determines whether the sender is on a collaboration list of the intended recipient. In the case that the sender is not on the collaboration list of the intended recipient, server computer 104 may store the electronic message until a natural breakpoint is reached. A natural breakpoint may be, for example, when a recipient changes their set status to "available", when the recipient is no longer participating in a meeting, when the recipient is finished editing a document, or when a recipient ends a phone call. Stored messages may be queued (e.g., queued messages 110) until the messages can be passed to electronic communication device 108 of the intended recipient.

Figure 2:
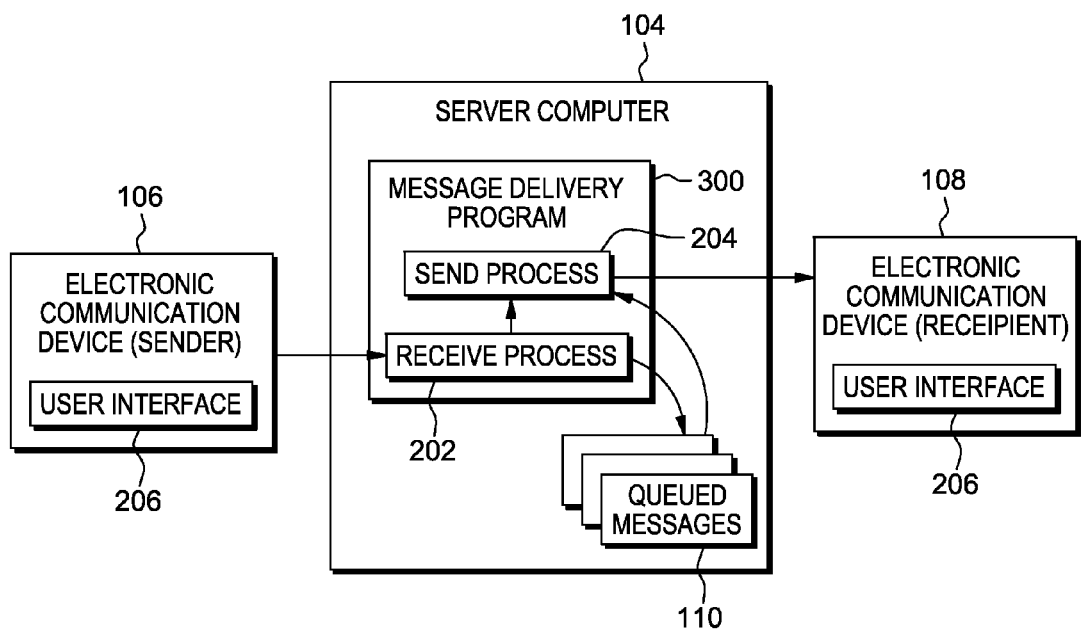
FIG. 2 is a data flow diagram of the distributed data processing environment in accordance with an exemplary embodiment of the present invention.

FIG. 2 visually represents the transfer of data in an exemplary embodiment of the present invention. The transfer of data in the example embodiment is an instant message between a sender and a recipient. In other embodiments there may be one or more users sending and receiving instant messages. As previously discussed, server computer 104 contains message delivery program 300 along with queued messages 110. In this example, server computer 104 is the medium for the process that occurs when a message is sent between the recipient and the sender.

In an exemplary scenario, the intended recipient of the instant message has a set status of "unavailable" due to a meeting or other collaborative event that the recipient needs to attend. In one embodiment of the present invention, message delivery program 300 determines users other than the intended recipient that are attending the same collaborative event and creates a collaboration list consisting of the determined users. Alternatively, or in addition to, the intended recipient may submit a list of users to be included on the collaboration list. Message delivery program 300 may only allow instant messages through to the intended recipient if the message originated from a user on the collaboration list.

User interface 206 on electronic communication device 106 displays messages to a user and allows for the user to input an instant message and specify a recipient for the instant message. Similarly, user interface 206 displays any received messages to a user of electronic communication device 108 (e.g., the intended recipient) and allows the user of electronic communication device 108 to reply with his or her own message. User interface 206 may also be used by a user to send a list of users allowed to contact them depending on a current status and other status dependent preferences. For example, user interface 206 may allow for the intended recipient to set a hierarchy of message delivery once a set status of the recipient changes to "available" to receive messages. The hierarchy includes an order for which messages in a queue will be forwarded on to the recipient as part of send process 204, compared to having the messages arrive based on the time they were initially sent. For example, if a manager of a recipient sends a message to the recipient initializing send process 204, the message from the manager may be delivered first regardless of when it arrived in the queue.

Subsequent to a sender creating an instant message, receive process 202 is initialized. In one embodiment, receive process 202 is part of message delivery program 300 and is located within server computer 104. Receive process 202 is initialized by a notification that a message is arriving from a sender. Receive process 202 determines whether the recipient has established an availability status which indicates that the recipient is in a meeting or should otherwise not be disturbed. A user name of the sender is associated with the instant message being sent and is cross checked with the collaboration list of the intended recipient. If the sender is on the collaboration list of the recipient then the message is forwarded to the recipient. If the sender is not on the collaboration list of the recipient then the instant message is stored as part of queued messages 110. Queued messages 110 are stored on server computer 104 until either message delivery program 300 determines that a natural breakpoint has been reached by the intended recipient or until the messages are requested by the intended recipient.

A natural breakpoint may be any point in time that the message delivery program 300 determines that the intended recipient is available to receive a message even though the intended recipient's status may indicate otherwise. In one embodiment of the invention, the natural breakpoint is when the recipient of the instant message becomes available when the meeting the intended recipient was participating in ends. Once the intended recipient becomes available to actively receive instant messages, the instant messages will be forwarded to the intended recipient in the order that they arrived as part of send process 204. In another embodiment, the messages can be forwarded as part of send process 204 based on preferences set by the recipient or on a determined importance of the instant message. For example, in one embodiment message delivery program 300 may search through the instant message for any key words indicated by the recipient through preferences. If key words are detected, the words are associated with the sender so the importance of the message can be established. For example, a message being sent to a recipient is analyzed in two areas; who the sender is and the number of pre-determined key words in the message. Depending on how many key words there are in the message and where the sender of the message is positioned in the hierarchy, message delivery program 300 determines the order in which the recipient receives the message once the recipient has a set status of "available."

Queued messages 110 can also be stored on a timeline based method. For example, the recipient may expect a break in a meeting every 30 minutes and will set a breakpoint for the allotted time when messages may be received. The time in between every breakpoint will be set by the recipient under their preferences using user interface 206 on electronic communication device 108. In another example, the instant message service is directly connected with a calendar which will determine when a meeting begins and ends. Message delivery program 300 has the ability to hold queued messages 110 until the breakpoint is reached which in this example is the end of the meeting the recipient is participating in.

Figure 3:
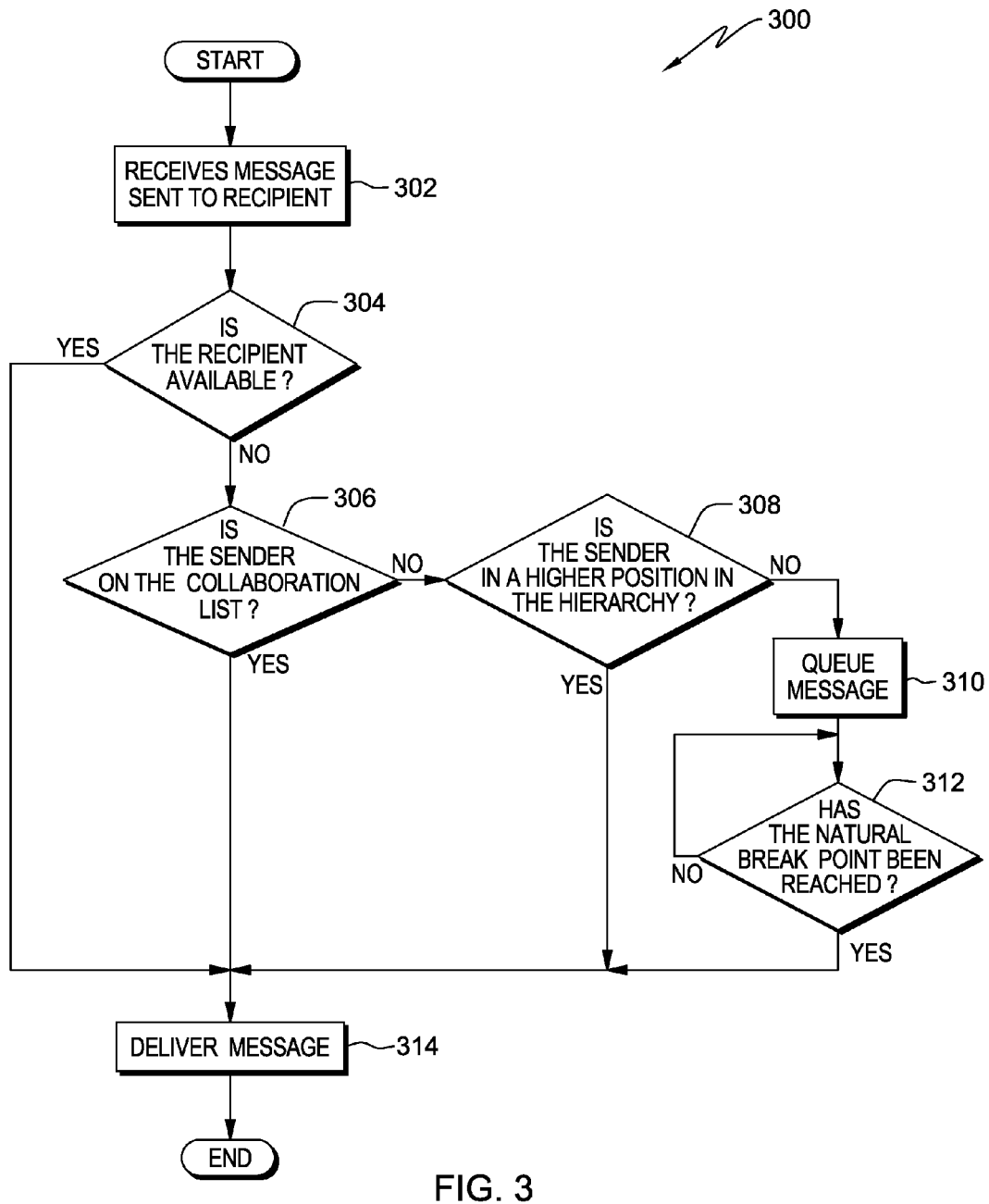
FIG. 3 is a flowchart illustrating steps for a message delivery program in accordance with an exemplary embodiment of the present invention.

FIG. 3 depicts the steps of message delivery program 300 when a recipient is unavailable to receive an electronic message from one or more senders. The steps outlined in the message delivery process are an example of one embodiment of the invention. Message delivery program 300 operates by receiving an electronic message and determining how to proceed in delivering the electronic message to the intended recipient.

In step 302, message delivery program 300 receives an electronic message being sent to an intended recipient from electronic communication device 106.

In step 304, message delivery program 300 determines whether the intended recipient of the electronic message is available to actively receive the electronic message. The determination of whether a recipient is actively available to receive electronic messages is based on the status of the recipient. In one embodiment, message delivery program 300 may query the computing device of the intended recipient to determine the current status. In another embodiment, any time a user, such as the intended recipient, changes their status, server computer 104 receives a notification of the change and stores the current status for each user locally.

In the case where message delivery program 300 determines that the intended recipient is actively available to receive an electronic message (yes branch, decision 304), the electronic message will be delivered to the recipient (step 314) with no further course of action taken. Alternatively, if message delivery program determines that the intended recipient is not available to receive an electronic message (no branch, decision 304), message delivery program 300 determines whether the sender of the electronic message is on a collaboration list (step 306) provided by the intended recipient or determined by server computer 104. In an example, a recipient is using an instant messaging program along with a corresponding calendar program that has the capabilities to schedule a meeting. The intended recipient establishes a meeting time with a list of other users. In one embodiment, the intended recipient may send that list of participants to server computer 104. In another embodiment, message delivery program 300 may have access to a central messaging and/or calendaring program on server computer 104 that can be accessed by multiple users. In such an embodiment, message delivery program 300 has access to local storage and if it is determined that the intended recipient is unavailable (e.g., "in a meeting"), message delivery program may search the local calendar program to see if the intended recipient is currently scheduled for a meeting, and if so, the other participants of the meeting, thereby determining the collaboration list.

In one embodiment, message delivery program 300 additionally displays the status of all users in a collaborative event as "available" to each of the other users.

In another embodiment, a sender determined to be in a higher job position might be deemed to be on the collaboration list according to any preferences received or set by the intended recipient. For example, a recipient of an electronic message is in a meeting with a list of collaborators. A manager of the recipient may not be participating in the meeting and attempts to contact the recipient even though the recipients status displays they are unavailable to receive electronic messages. Message delivery program 300 may determine that even though the sender is not participating in the meeting, the sender's higher position in the hierarchy (yes branch, decision 308) means the message should still be delivered to the recipient.

Responsive to determining that the sender is on the collaboration list (yes branch, decision 306) or in a higher position in the hierarchy (yes branch, decision 308), message delivery program 300 delivers the message to the intended recipient. Alternatively, responsive to determining that the sender is not on the collaboration list (no branch, decision 306) and in a lower position in the hierarchy (no branch, decision 308), the message is queued on server computer 104 (step 310).

In an example embodiment, the message being queued is stored on a local storage device until it is called upon by message delivery program 300 to be sent to the intended recipient. Queued messages stored on a local storage device may be placed in the order in which they will be delivered to the intended recipient. The order the messages are queued is dependent on the preferences the intended recipient sets when utilizing message delivery program 300. In an example, the messages are queued based on a timeline in which the message which arrived first is sent to the recipient first once the status of the recipient changes to being able to receive messages. The message which arrives second is queued in the second position and so on for the proceeding messages. In another embodiment, the messages can be queued based on the position of the sender in a hierarchy established by the recipient in the preferences. A sender higher in a hierarchy has a message moved towards the beginning of the queue so the message may be delivered first once the recipient becomes available to receive messages.

Queued messages can also be placed in an order of importance of the message which is being sent to the recipient. The order of importance of the message can be dependent on key words which are found in the title of the message and/or in the body of the message. The key words can be set in preferences of message delivery program 300 by the intended recipient of the messages. In an example, two messages may be sent by two different senders to a recipient. Since both senders are not on the collaboration list established by the recipient, the messages are queued. Based on the preference set by the recipient, the message containing the most key words in the title and body of the message will be moved first in the queue as it may be assumed that the message with the most key words is of higher importance.

In step 312, message delivery program 300 determines if a natural breakpoint has been reached by the intended recipient. The natural breakpoint signals for message delivery program 300 to proceed with the delivery of the queued messages. In one example, queued messages are being stored on a local storage device until a recipient becomes available to receive the messages. The recipient is in a meeting which is indicated in message delivery program 300 and the meeting is proceeding on a schedule previously established. As long as the intended recipient is in the scheduled meeting the intended recipient will not receive the queued messages. As soon as the scheduled meeting ends, message delivery program 300 determines the intended recipient is available to receive messages. The messages are then forwarded to the intended recipient.

In another example, an intended recipient of an electronic message is on a conference call. The intended recipient receives messages from users not on the conference collaboration list and they are queued until a natural breakpoint is reached. The natural breakpoint for the teleconference call is when the recipient hangs up the phone and leaves the teleconference. The "on hook" and "off hook" status of the recipient's phone determines whether the queued messages can be forwarded to the recipient. In one embodiment, a phone is operating on the same data communications network 102 as a computer of a recipient of a message. If the recipient is on a conference call, the recipient is unavailable to actively receive messages while the phone is being used by the recipient. Once the conference call ends, the computer of the recipient will signal message delivery program 300, the conference call has ended and the recipient is available to actively receive messages. Message delivery program 300 then forwards any queued messages 110 to the recipient.

In one embodiment, a recipient of an electronic message is working on creating a document on electronic communication device 108. The program used to create the document notifies electronic communication device 108 when the document is saved by the recipient. To ensure the electronic message being sent to the recipient does not interfere with the recipient creating the document, any messages sent to the recipient are queued. The program being used by the recipient to create the document signals to electronic communication device 108 to notify message delivery program 300 that the saving of the document being worked on by the intended recipient represents a natural breakpoint. This breakpoint allows for any queued messages to be forwarded to the intended recipient without interfering with the creation of the document. Such a natural breakpoint can also be implemented if the recipient switches between applications being used or between two documents being worked on. The breakpoint between switching applications or documents allows for message delivery program 300 to forward the messages to the recipient without interfering with the recipient's work.

In another embodiment, message delivery program 300 can work along side an operating system on a computer of a recipient of an electronic message. When the recipient is actively using an application on the operating system, the computer of the recipient notifies message delivery program 300 to queue any messages. Once the computer of the recipient determines the recipient is no longer actively using an application, the computer notifies message delivery program 300 that queued messages 110 need to be delivered to the recipient. In an example, where the recipient switches between one or more applications, the computer of the recipient notifies message delivery program 300, queued message 110 need to be delivered to the recipient.

In response to determining that a natural breakpoint has been reached (yes branch, decision 312), message delivery program 300 delivers the electronic message to electronic communication device 108 of the intended recipient (step 314). After the messages have been received by the recipient, the recipient has the ability to adjust any preferences to ensure any queued message gets delivered in proper order the next time the recipient is unavailable to receive any messages.

Figure 4:
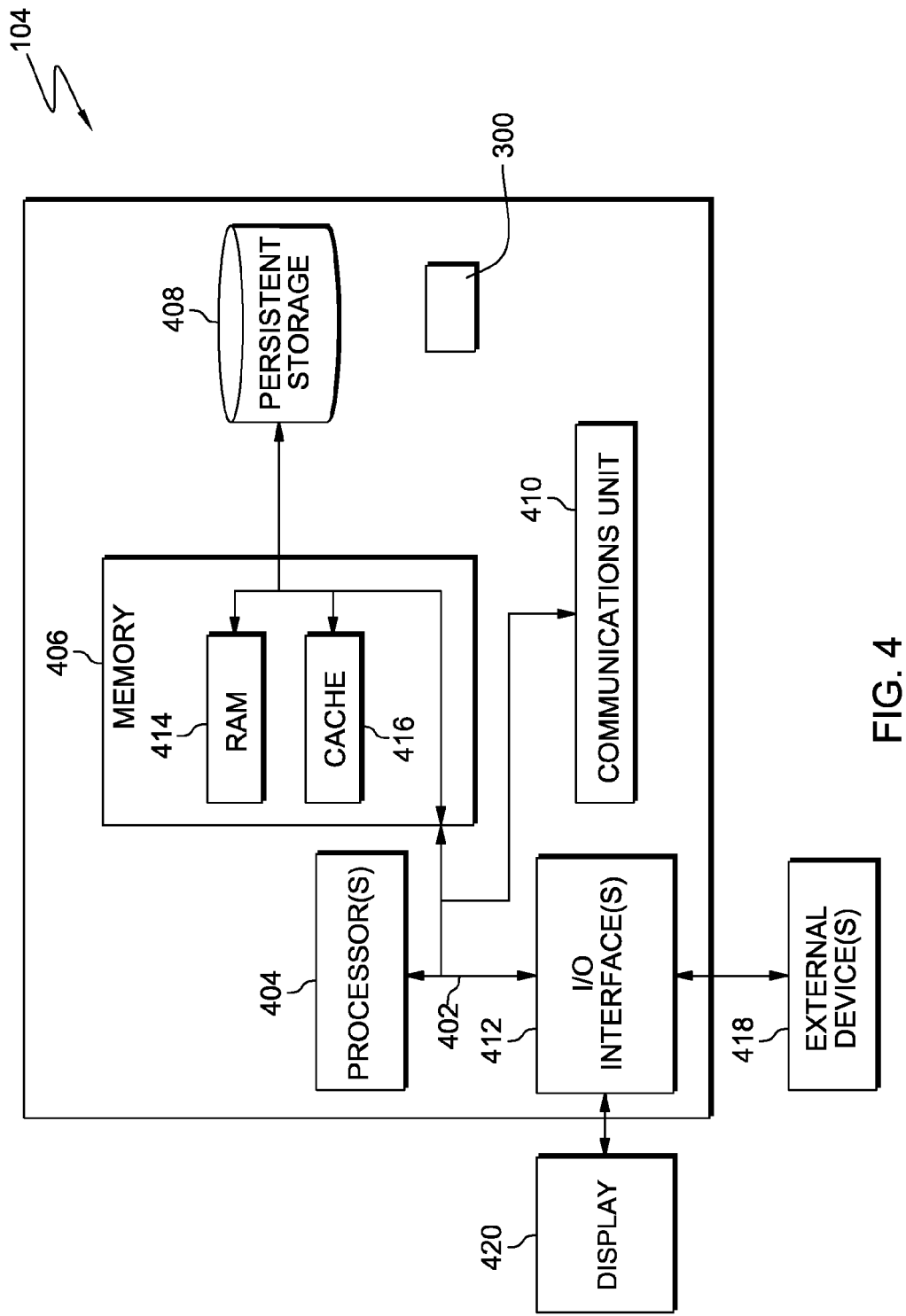
FIG. 4 illustrates a block diagram of hardware and software included in the system of FIG. 1 in accordance with an exemplary embodiment of the present invention.

FIG. 4 depicts a block diagram of components of server computer 104 in accordance with an illustrative embodiment. It should be appreciated that FIG. 4 provides only an illustration of one implementation and does not imply any limitations with regard to the environment in which different embodiments may be implemented. Many modifications to the depicted environment may be made.

Server computer 104 includes communications fabric 402, which provides communications between processor(s) 404, memory 406, persistent storage 408, communications unit 410, and input/output (I/O) interface(s) 412.

Memory 406 and persistent storage 408 are examples of computer-readable tangible storage devices. A storage device is any piece of hardware that is capable of storing information, such as, data, program code in functional form, and/or other suitable information on a temporary basis and/or permanent basis. Memory 406 may be, for example, one or more random access memories (RAM) 414, cache memory 416, or any other suitable volatile or non-volatile storage device.

Message delivery program 300 is stored in persistent storage 408 for execution by one or more of the respective processors 404 via one or more memories of memory 406. In the embodiment illustrated in FIG. 4, persistent storage 408 includes flash memory. Alternatively, or in addition to, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. In another embodiment still, server computer 104 may be devoid of communications unit 410. Message delivery program 300 may be downloaded to persistent storage 408 through communications unit 410.

I/O interface(s) 412 allows for input and output of data with other devices that may be connected to server computer 104. For example, I/O interface 412 may provide a connection to external devices 418 such as a keyboard, keypad, a touch screen, and/or some other suitable input device. I/O interface(s) may also connect to a display 420.

Display 420 provides a mechanism to display data to a user and may be, for example, a computer monitor.

Based on the foregoing, a method, computer system, and computer program product have been disclosed for focused real time collaboration. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A method for processing an electronic message, the method comprising:
   receiving an electronic message from a first user, the electronic message being addressed to an intended recipient;
   determining that a posted status of the intended recipient indicates that the intended recipient is not available to actively receive electronic messages from users;
   analyzing whether the first user is on a list of one or more users in a collaborative event with the intended recipient, when the posted status of the intended recipient indicates that the intended recipient is not available;
   in response to determining that the first user is not on the list of the one or more users, storing the electronic message in a local storage;
   determining that a natural breakpoint is reached in the collaborative event by the intended recipient indicating that the intended recipient is available to actively receive electronic messages from users regardless of the posted status of the intended recipient; and
   in response to determining that the natural breakpoint has been reached, transmitting the electronic message, from the local storage, to a computer of the intended recipient.

2. The method of claim 1, further comprising:
   in response to determining that one or more electronic messages are being stored in the local storage, determining an order for delivery of the one or more electronic messages based on a hierarchy of senders of the one or more electronic messages.

3. The method of claim 2, wherein the hierarchy is based on one or both of a job position title and relationship between a respective sender and the intended recipient.

4. The method of claim 1, further comprising:
   in response to determining that one or more electronic messages are being stored in the local storage, determining an order for delivery of the one or more electronic messages based on a number of key words contained in each respective electronic message of the one or more electronic messages.

5. The method of claim 1, wherein the electronic message is selected from a group consisting of: an email message, an instant message and a live video stream chat.

6. The method of claim 1, wherein the natural breakpoint is selected from a group consisting of: a predetermined timeline, saving of a document, switching applications, and status of a phone call.

7. A computer program product for processing an electronic message, the computer program product comprising:
   one or more computer-readable storage devices media and program instructions
   stored on the one or more computer-readable storage devices, the program instructions comprising;
   program instructions to receive an electronic message from a first user, the electronic message being addressed to an intended recipient;
   program instructions to determine that a posted status of the intended recipient indicates that the intended recipient is not available to actively receive electronic messages from users;
   program instructions to analyze whether the first user is on a list of one or more users in a collaborative event with the intended recipient when the posted status indicates that the intended recipient is not available;
   in response to determining that the first user is not on the list of the one or more users, program instructions to store the electronic message in a local storage;
   program instructions to determine that a natural breakpoint is reached in the collaborative event by the intended recipient indicating that the intended recipient is available to actively receive electronic messages from users regardless of the posted status of the intended recipient; and
   in response to determining that the natural breakpoint has been reached, program instructions to transmit the electronic message, from the local storage, to a computer of the intended recipient.

8. The computer program product of claim 7, further comprising program instructions, stored on the one or more computer-readable storage devices, to:
   in response to determining that one or more electronic messages are being stored in the local storage, determine an order for delivery of the one or more electronic messages based on a hierarchy of senders of the one or more electronic messages.

9. The computer program product of claim 8, wherein the hierarchy is based on one or both of a job position title and relationship between a respective sender and the intended recipient.

10. The computer program product of claim 7, further comprising program instructions, stored on the one or more computer-readable storage devices, to:

in response to determining that one or more electronic messages are being stored in the local storage, determine an order for delivery of the one or more electronic messages based on a number of key words contained in each respective electronic message of the one or more electronic messages.

11. The computer program product of claim 7, wherein the electronic message is selected from a group consisting of: an email message, an instant message and a live video stream chat.

12. The computer program product of claim 7, wherein the natural breakpoint is selected from a group consisting of: a predetermined timeline, saving of a document, switching applications, and status of a phone call.

13. A computer system for processing an electronic message, the computer system comprising:

one or more processors;

one or more computer-readable storage devices;

program instructions stored on the one or more computer-readable storage devices for execution by at least one of the one or more processors, the program instructions comprising:

program instructions to receive an electronic message from a first user, the electronic message being addressed to an intended recipient;

program instructions to determine that a posted status of the intended recipient indicates that the intended recipient is not available to actively receive electronic messages from users;

program instructions to analyze whether the first user is on a list of one or more users in a collaborative event with the intended recipient when the posted status indicates that the intended recipient is not available;

in response to determining that the first user is not on the list of the one or more users, program instructions to store the electronic message in a local storage;

program instructions to determine that a natural breakpoint is reached in the collaborative event by the intended recipient indicating that the intended recipient is available to actively receive electronic messages from users regardless of the posted status of the intended recipient; and in response to determining that the natural breakpoint has been reached, program instructions to transmit the electronic message, from the local storage, to a computer of the intended recipient.

14. The computer system of claim 13, further comprising program instructions stored on the one or more computer-readable storage devices for execution by at least one of the one or more processors, to:

in response to determining that one or more electronic messages are being stored in the local storage, determine an order for delivery of the one or more electronic messages based on a hierarchy of senders of the one or more electronic messages.

15. The computer system of claim 14, wherein the hierarchy is based on one or both of a job position title and relationship between a respective sender and the intended recipient.

16. The computer system of claim 13, further comprising program instructions stored on the one or more computer-readable storage devices for execution by at least one of the one or more processors, to:

in response to determining that one or more electronic messages are being stored in the local storage, determine an order for delivery of the one or more electronic messages based on a number of key words contained in each respective electronic message of the one or more electronic messages.

17. The computer system of claim 13, wherein the electronic message is selected from a group consisting of: an email message, an instant message and a live video stream chat.

18. The computer system of claim 13, wherein the natural breakpoint is selected from a group consisting of: a predetermined timeline, saving of a document, switching applications, and status of a phone call.

* * * * *